United States Patent Office 3,803,231
Patented Apr. 9, 1974

3,803,231
AMMONOLYSIS OF 2-NITRO-6-OXIMINO CYCLOHEXANONE
Robert Fuhrmann, Morris Plains, Fred W. Koff, Clifton, and John Pisanchyn, Morristown, N.J., assignors to Allied Chemical Corporation, New York, N.Y.
No Drawing. Original application Dec. 11, 1970, Ser. No. 97,290. Divided and this application Jan. 18, 1973, Ser. No. 324,689
Int. Cl. C07c 97/02
U.S. Cl. 260—561 R    3 Claims

ABSTRACT OF THE DISCLOSURE 2-nitro-6-oximino cyclohexanone can be reacted with anhydrous ammonia in a solvent selected from the group consisting of $C_1$ to $C_4$ alkanols and $C_4$ to $C_8$ aliphatic and alicyclic mono- or di-ethers to afford 2-oximino-6-nitro-caproamide, a precursor of lysine.

This is a Division of application Ser. No. 97,290, filed Dec. 11, 1970.

BACKGROUND OF THE INVENTION

This invention relates to a process for the preparation of a precursor of lysine, one of the essential amino acids useful as a dietary supplement. More particularly, this invention relates to a process for the preparation of 2-oximino-6-nitro-caproamide (Compound I) by ammonolysis of 2-nitro-6-oximino cyclohexanone. The compound 2-oximino-6-nitrocaproamide can be transformed into lysine by reduction of the nitro and oximino groups thereof to amino groups followed by hydrolysis of the amide to the free acid, i.e.

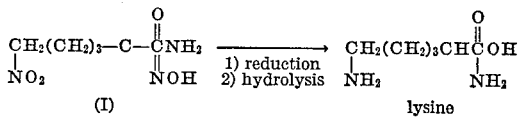

The prior art contains much teaching of various synthetic routes to lysine. All clearly suffer from one or more shortcomings since none have achieved widespread commercial acceptance. Specifically, a facile synthesis of lysine utilizing cheap, commercially available starting materials is not yet known to the art. Lysine amide is resolved into its optical isomers and thereafter transformable into the corresponding lysine isomer by known prior art methods. Lysine amide is also a very desirable compound per se for the reason it can be readily resolved into the biologically active L-isomer and the separated D-isomer racemized. Since L-lysine amide itself is nutritionally valuable, it need not be transformed into L-lysine. The instant invention is therefore directed to a novel compound which is a precursor of lysine amide and also to a process for the preparation of said novel compound from 2-nitro-6-oximino cyclohexanone.

The synthetic route, which entails starting with the known compound α-nitro cyclohexanone, is as follows:

(1)
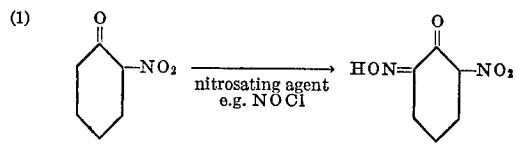

(2)
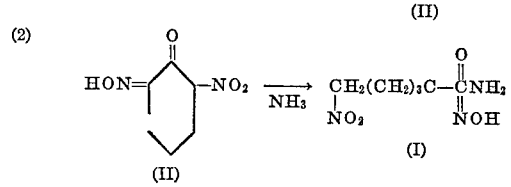

(3)
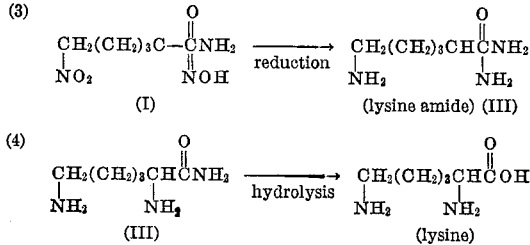

(4)

$$\underset{\underset{NH_2}{|}}{CH_2(CH_2)_3}\overset{O}{\overset{\|}{C}}NH_2 \xrightarrow{\text{hydrolysis}} \underset{\underset{NH_2}{|}}{CH_2(CH_2)_3}\overset{O}{\overset{\|}{C}}OH$$
(III)    (lysine)

The instant invention is directed to process step 2 in the above-indicated reaction sequence and to novel Compound I. In addition to being a precursor of lysine amide, Compound I is an effective fungicide. The starting material for process step 2 is 2-nitro-6-oximino cyclohexanone (Compound II), which is obtained by reacting α-nitrocyclohexanone with a nitrosating agent such as alkyl nitrites, nitrogen oxides, nitrosylformate or nitrosyl chloride in an inert solvent such as diglyme. Compound II is not reported in the prior art literature, however, it can be readily prepared as described above and separated from the inert solvent by evaporating off the latter, preferably at reduced pressure. Compound II is a pale yellow solid having a melting point of 160° C. Compound II and its preparation are described in copending commonly assigned U.S. patent application Ser. No. 852,947, now U.S. Pat. 3,681,460 and Ser. No. 852,881, now abandoned both filed Aug. 25, 1969.

The transformation of Compound II into Compound I is effected by contacting the former with a sufficient quantity of anhydrous ammonia in the presence of a solvent selected from the group consisting of $C_1$ to $C_4$ alkanols and $C_4$ to $C_8$ aliphatic and alicyclic mono- or di-ethers. Contacting Compound II with anhydrous ammonia in the absence of solvent affords substantial amounts of by-product. Reaction with ammonia in the presence of water affords an intractable complex mixture of products, possibly including Compound I. Examples of the above-indicated suitable solvents include methanol, ethanol, isopropanol, n-butanol, t-butanol, diethyl ether, di-isopropyl ether, glyme, diglyme, diethyl carbitol, tetrahydrofuran and dioxan. The preferred solvents are glyme (dimethoxyethane), t-butanol, and dioxan. Mixtures of any of the above solvents can also be used.

The amount of ammonia reacted with Compound II is not critical, provided at least one mole of ammonia per mole of Compound II is present. Preferably from 5.0 to about 25.0 moles of ammonia per mole of Compound II will be present. Greater than 25.0 moles of ammonia has no deleterious effect but provides no increase in reaction rate or yield. The amount of solvent present can suitably vary from about 1.0 to 20.0 parts by weight per part of 2-nitro-6-oximino cyclohexanone. Greater than 20 parts by weight of solvent per part of Compound II is not deleterious but serves no useful purpose and is inconvenient in that it must be removed from the product.

The ammonolysis reaction can suitably be carried out at any temperature ranging from about 20° C. up to about 150° C., at which temperature some decomposition of the 2-nitro-6-oximino cyclohexanone commences. It is preferred that the reaction be carried out at a temperature ranging from about 40° to 120° C. Since this is above the boiling point of ammonia (−33°), such reaction temperatures require a closed pressure vessel. Ordinarily, the preferred reaction procedure entails placing the desired quantities of ammonia, solvent, and 2-nitro-6-oximino cyclohexanone in a reaction vessel, sealing same, and then bringing the vessel contents to the desired temperature. As above indicated, use of a closed vessel and temperatures above the ammonia boiling point result in developing a super atmospheric pressure in the reaction vessel, which pressure will, of course, vary with temperature and the volume of reactants and vessel. However, the reaction pressure is not critical and appears to have no substantial effect on reaction rate or product yield and purity.

Preferably, the reaction vessel will be fabricated of, or lined with glass or other inert material to prevent any possible contamination of the product.

The reaction time is not critical and ordinarily, complete ammonolysis will be effected within a period of from about ½ to 24 hours, the exact period of time being dependent primarily on the reaction temperature. Longer reaction times ordinarily serve no useful purpose.

While we do not wish to be bound by any particular mechanistic interpretation, it is believed that when the reaction solvent is a $C_1$ to $C_4$ alkanol, the reaction proceeds by the following sequence of reactions.

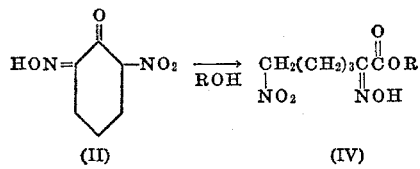

wherein R is a $C_1$ to $C_4$ alkyl group.

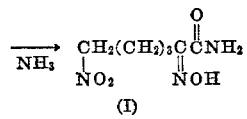

If 2-nitro-6-oximino cyclohexanone (Compound II) is reacted with a $C_1$ to $C_4$ alkanol in the absence of ammonia, novel Compound IV is obtained and can be isolated. Reaction of Compound IV with ammonia affords Compound I.

When the reaction solvent is a $C_4$ to $C_8$ aliphatic or alicyclic mono- or di-ether, a stable intermediate such as Compound IV is probably not being formed. No reaction of Compound II with such ether occurs in the absence of ammonia.

Isolation and purification of Compound I from the reaction mixture containing solvent and any unreacted excess ammonia is most suitably effected by evaporation of the solvent and ammonia, preferably at reduced pressure, and then recrystallizing the residue which comprises essentially crude Compound I. The preferred recrystallization solvent is a chlorinated alkane, particularly preferred is dichloro ethane. Pure Compound I is a yellow crystalline solid of M.P. 96.5–97.5°.

The yield obtained when preferred reaction conditions are utilized is essentially quantitative.

The invention can be more fully understood by reference to the following examples. All parts are parts by weight unless otherwise expressly noted.

EXAMPLE 1

Ammonolytic cleavage of 2-oximino-6-nitro cyclohexanone

To a 6 oz. Fischer & Porter aerosol compatability tube was charged 8.3 grams of 2-oximino-6-nitro cyclohexanone and 80 ml. of dioxane. Stirring was effected with a magnetic stirring bar at room temperature to achieve solution. The reaction vessel (tube) and charge was purged of air by five pressurizations with $N_2$ followed by venting to atmospheric pressure. The reaction vessel was then placed in a heated silicone oil bath and the temperature brought up to 62° C. At this temperature, the reactor was pressurized with ammonia to 110 p.s.i.g. Immediate precipitation of the ammonium salt of 2-oximino-6-nitro cyclohexanone occurred. Stirring was continued together with repressurizations with ammonia until complete solution of the precipitated salt occurred. After 5.75 hours of reaction, heating was terminated, the reaction mixture cooled to room temperature, and the ammonia vented. The solution was then flash evaporated at reduced pressure in a Buchler rotating flash evaporator to obtain 9.10 grams of solids (theoretical is 9.08 grams). The dry, crude product was recrystallized from ethylene dichloride affording 8.00 grams of the pure product, 2-oximino-6-nitro hexanamide (88.7 yield). The recrystallized product was shown to be free of the starting material and any other impurity by thin-layer chromatography.

EXAMPLE 2

Additional runs were made utilizing the reaction and work-up procedures of Example 1. Results are tabulated below.

| Run No. | 1 | 2 |
|---|---|---|
| Charge: | | |
| NOC, parts by weight | 2.010 | 2.025 |
| Solvent | Glyme | (1) |
| Ammonia, parts by weight | 3.6 | 2.7 |
| Reaction parameters: | | |
| Time, hours | 5 | 5 |
| Temperature, °C | 60 | 60 |
| Weight ratio $NH_3$/NOC | 1.79 | 1.33 |
| Mol ratio $NH_3$/NOC | 17.2 | 13.2 |
| Solvent/NOC wt. ratio | 8.7 | 8.9 |
| Product, mol percent yield ONH (2-oximino-6-nitro hexanamide) | 98.5 | 95.7 |

1 Tetrahydrofuran.

EXAMPLE 3

An extensive series of runs were conducted using varying ratios of reactants, reaction solvent, reaction time, and reaction temperature. Results are tabulated below. In all instances, the desired quantities of α-nitro-ω-oximino cyclohexanone (NOC) and solvent were charged to a pressure reaction vessel, purged of air, anhydrous ammonia added, and the reaction vessel sealed and then agitated by stirring or shaking for the desired time with heating. Work-up of reaction mixture was in all cases carried out as in Example 1.

| Run No. | Mole ratio $NH_3$:NOC | Wt. ratio solvent:NOC | Solvent | Reaction Time (hrs.) | Reaction Temp. (°C.) | Approximate product yield, percent |
|---|---|---|---|---|---|---|
| 1 | 10.0 | 1.5 | Dioxane | 18 | 25 | 94 |
| 2 | 12.0 | 5 | do | 16 | 25 | 95 |
| 3 | 15.0 | 10 | THF | 10 | 50 | 96 |
| 4 | 25.0 | 5 | THF | 20 | 50 | 96 |
| 5 | 10.0 | 5 | THF | 5 | 75 | 95 |
| 6 | 17.0 | 5 | $CH_3OH$ | 1.5 | 80 | 85 |
| 7 | 12.0 | 5 | $CH_3OH$ | 1.5 | 75 | 84 |
| 8 | 10.0 | 2.0 | Glyme | 1.0 | 20 | 50 |
| 9 | 3.0 | 3.0 | do | 24 | 20 | 70 |
| 10 | 2.0 | 4.0 | do | 10 | 40 | 78 |
| 11 | 2.0 | 3.0 | Diethyl ether | 10 | 60 | 84 |
| 12 | 12.0 | 3.0 | Diglyme | 5 | 60 | 92 |
| 13 | 6.0 | 3.0 | Ethanol | 5 | 60 | 85 |
| 14 | 6.0 | 3.0 | Dioxane | 5 | 60 | 89 |
| 15 | 8.0 | 3.0 | do | 5 | 60 | 91 |
| 16 | 7.5 | 5.0 | t-Butanol | 3 | 120 | 95 |
| 17 | 1.5 | 3.0 | Dioxane | 5 | 50 | 70 |
| 18 | 11.5 | 2.0 | $CH_3OH$ | 5 | 55 | 83 |
| 19 | 17 | 5.0 | $CH_3OH$ | 3 | 60 | 84 |
| 20 | 15 | 8 | t-Butanol | 5 | 65 | 95 |

NOTE.—Glyme=dimethoxy ethane; THF=tetrahydrofuran.

We claim:
1. A process comprising contacting 2-nitro-6-oximino cyclohexanone with at least an equimolar amount of anhydrous ammonia in the presence of from about 1 to 10 parts by weight per part of 2-nitro-6-oximino cyclohexanone of a solvent selected from the group consisting of $C_1$ to $C_4$ alkanols and $C_4$ to $C_8$ aliphatic and alicyclic mono- and di-ethers at a temperature ranging from about 20° C. to 150° C.
2. A process in accordance with claim 1 wherein said solvent is a $C_4$ to $C_8$ aliphatic or alicyclic diether.
3. A process in accordance with claim 1 wherein said temperature ranges from about 40° to 120° C.

References Cited
FOREIGN PATENTS
1,203,540    8/1970    Great Britain _____ 260—482

LORRAINE A. WEINBERGER, Primary Examiner

P. J. KILLOS, Assistant Examiner

U.S. Cl. X.R.

260—482 R, 534 L, 561 A, 566 A; 424—320